United States Patent [19]
Li et al.

[11] Patent Number: 6,031,880
[45] Date of Patent: Feb. 29, 2000

[54] CARRIER RECOVERY IN COMMUNICATIONS SYSTEM

[75] Inventors: Yong Li, Kanata; Adnan Abu-Dayya, Ottawa; Hong Zhao, Nepean; Rui Wang, Ottawa, all of Canada; Iouri Trofimov, Moskva, Russian Federation; Alexandre Chloma; Mikhail Bakouline, both of Moskovskaja oblast, Russian Federation; Vitali Kreindeline, Moskva, Russian Federation

[73] Assignee: Nortel Networks Corporation, Montreal, Canada

[21] Appl. No.: 08/674,725

[22] Filed: Jul. 2, 1996

Related U.S. Application Data

[60] Provisional application No. 60/000,948, Jul. 7, 1995, and provisional application No. 60/011,006, Feb. 1, 1996.

[51] Int. Cl.[7] .................................................. H04L 27/14
[52] U.S. Cl. ........................................ 375/326; 375/365
[58] Field of Search .................................. 375/326, 327, 375/324, 365, 272, 348; 329/307, 308; 370/503, 509, 512, 516; 371/47.1; 364/724.1

[56] References Cited

U.S. PATENT DOCUMENTS

| | | | |
|---|---|---|---|
| 5,151,925 | 9/1992 | Gelin et al. ............................... | 375/82 |
| 5,165,051 | 11/1992 | Kumar ................................. | 364/724.06 |
| 5,233,632 | 8/1993 | Baum et al. ............................ | 375/116 |
| 5,249,205 | 9/1993 | Chennakesku et al. ................. | 375/101 |
| 5,337,331 | 8/1994 | Sadot et al. .............................. | 375/83 |
| 5,432,816 | 7/1995 | Gozzo ..................................... | 375/232 |
| 5,432,821 | 7/1995 | Polydoros et al. ..................... | 375/340 |
| 5,475,710 | 12/1995 | Ishizu et al. ............................ | 375/232 |
| 5,500,876 | 3/1996 | Nagata .................................... | 375/332 |
| 5,596,608 | 1/1997 | Sassa et al. ............................. | 375/346 |
| 5,848,060 | 12/1998 | Dent ....................................... | 370/281 |

FOREIGN PATENT DOCUMENTS 0 639 913   2/1995   European Pat. Off. .

OTHER PUBLICATIONS

Ho et al., "On Pilot Symbol Assisted Detection of MSK and GTFM in Fast Fading Channels", Proceedings of the Global Telecommunications Conf., vol. 2, (1994) pp. 967–972.

*Primary Examiner*—Chi H. Pham
*Assistant Examiner*—Emmanuel Bayard
*Attorney, Agent, or Firm*—Foley & Lardner

[57] ABSTRACT

A method of carrier recovery in a wireless communications system using a known synchronization word, for example an IS-54 TDMA system, operates in two stages to produce an estimate of carrier phase. In the first stage, a complex fading factor, embodying carrier phase information, is estimated from the synchronization word in the received signal using a least square criterion. In the second stage, the carrier phase is estimated from this complex fading factor by averaging. The averaging can provide a recursive average or a moving average, or can be implemented using Kalman filtering which also provides an estimated amplitude factor and frequency shift. The method and apparatus provide a substantial improvement over phase locked loop carrier recovery.

15 Claims, 3 Drawing Sheets

CARRIER RECOVERY IN COMMUNICATIONS SYSTEM

This application claims the benefit of United States Provisional Applications No. 60/000,948 filed Jul. 7, 1995 and No. 60/011,006 filed Feb. 1, 1996.

This invention relates to carrier recovery in communications systems.

BACKGROUND OF THE INVENTION

This invention is applicable to communications systems generally, and is especially applicable to, and is described below in the context of, TDMA (time division multiple access) cellular communications systems compatible with EIA/TIA document IS-54-B: Cellular System Dual-Mode Mobile Station--Base Station Compatibility Standard (Rev. B). For convenience and brevity, such a system is referred to below simply as an IS-54 system. In such a system, data is communicated in time slots each comprising a sync (synchronization) word of 14 symbols followed by an information sequence. The sync word is used among other things to facilitate carrier recovery. The manner in which carrier recovery is implemented has a direct impact on the performance of the system.

In cellular communications systems, carrier recovery is made difficult by fading and interference or noise. Although conventional PLL (phase locked loop) carrier recovery systems are well understood and widely used in wireless communications systems, they do not perform satisfactorily in noisy (or low SNR (signal-to-noise ratio)) and fading channel environments, such as can occur in cellular communications systems.

An object of this invention is to provide an improved method of and apparatus for use in carrier recovery using a known sync word in a received communications signal.

SUMMARY OF THE INVENTION

The invention provides a method of carrier recovery using a known sync (synchronization) word in a received communications signal, comprising the steps of: estimating from symbols of the sync word a complex fading factor, embodying information of carrier phase, using a least square criterion; and estimating carrier phase from the complex fading factor using an averaging process.

The step of estimating the complex fading factor conveniently comprises performing a one-step optimal estimate using known symbols of the sync word and zero values for unknown symbols adjacent to the sync word.

The step of estimating carrier phase can comprise providing a recursive average or a moving average of the complex fading factor, or it can comprise Kalman filtering the complex fading factor. In the latter case an amplitude factor and a frequency shift of the complex fading factor may also be estimated, and Kalman filter gain may be recursively determined from the estimated carrier phase, amplitude factor, and frequency shift.

The invention also provides apparatus for use in carrier recovery from a received communications signal including a known sync (synchronization) word, the apparatus comprising: a linear transform unit responsive to samples of the received signal and to a sampling delay signal for estimating from sampled symbols of the sync word a complex fading factor, embodying information of carrier phase, using a least square criterion; an averaging unit for producing an average of the complex fading factor; and a unit for producing an argument of the average to constitute an estimated carrier phase for carrier recovery. These units can conveniently be constituted by functions of at least one digital signal processor.

The least square criterion and extended Kalman filtering are known, for example from M. H. A. Davis and R. B. Vinter, "Stochastic Modeling and Control", Chapman and Hall, London, 1985.

BRIEF DESCRIPTION OF THE DRAWINGS

The invention will be further understood from the following description with reference to the accompanying drawings, in which.

DETAILED DESCRIPTION

Figure 1:
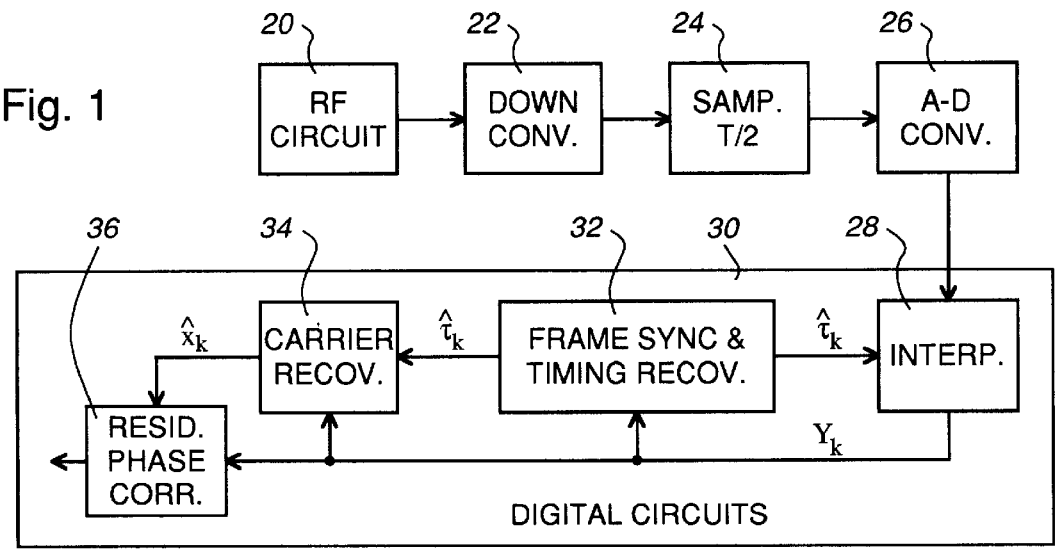
FIG. 1 schematically illustrates a block diagram of parts of a wireless digital communications receiver.

The following description first presents a model for an IS-54 system, and then describes methods of carrier recovery in accordance with embodiments of the invention. Physical implementations of carrier recovery arrangements for carrying out these methods, and their relative performance, are then described with reference to the drawings. Although this detailed description relates specifically to an IS-54 system, it is emphasized that this is by way of example and that the invention is applicable to other communications systems.

Signal and Observation Models

An IS-54 system uses $\pi/4$-shifted DQPSK (differential quadrature phase shift keyed) signal symbols which can be described by the equations:

$$s_k = s_{k-1} \cdot w_k, \quad w_k = (\theta_k + j\upsilon_k)\sqrt{2}, \quad k = 1, 2, 3, \tag{1}$$

where k is a positive integer identifying the symbol $s_k$, $w_k$ is a complex value, representing binary information, with real and imaginary parts $\theta_k$ and $\upsilon_k$ respectively, $\theta_k, \upsilon_k \in \{-1, 1\}$ (i.e. each of $\theta_k$ and $\upsilon_k$ is one of the set of values $-1$ and $1$, i.e. is either $-1$ or $1$); and $|s_k| = 1$ for any k (i.e. the amplitude of $s_k$ is 1).

With sampling as is usual at twice the symbol rate, a discrete observation model of the received signal samples has the form:

$$y_{2k-1} = U_{2k-1}\left(\sum_{i=k-m}^{k+m} s_i g((k-i)T - \tau - T/2)\right) + \eta_{2k-1} \tag{2}$$

$$y_{2k} = U_{2k}\left(\sum_{i=k-m}^{k+m} s_i g((k-i)T - \tau)\right) + \eta_{2k} \tag{3}$$

where $Y_{2k-1}$ and $Y_{2k}$ are the two complex signal samples in a symbol space k, i and m are integers with 2m being the number of symbols contributing to inter-symbol interference (ISI) in the model, T is the symbol spacing, $\tau$ is a sampling delay (period between optimal and actual sampling times) in the symbol space k and is in the range from $-T/2$ to $T/2$, $U_{2k-1}$ and $U_{2k}$ are unknown complex fading factors during the symbol space k, $g(t)$ is the impulse response of the channel filters (the transmit and receive filters combined) given by $$g(t) = \left(\frac{\sin(\pi t/T)}{\pi t/T}\right)\left(\frac{\cos(\alpha \pi t/T)}{1-(2\alpha t/T)^2}\right)$$

where α is the filter roll-off coefficient, and $\eta_{2k-}$ and $\eta_{2k}$ are complex Gaussian random variables with zero mean and variance 2 $\sigma_\eta^2$, $\sigma_\eta^2$ being the variance of both the real and imaginary parts of the noise.

These expressions describe the signal and observation models which are used to derive the carrier recovery algorithm as described below.

Carrier Recovery Method

It is assumed for convenience that m=2 and that the complex fading factors $U_{2k-1}$ and $U_{2k}$ are the same during the symbol space, each being represented by the product of an amplitude factor $A_k$ and a carrier phase shift $e^{jx_k}$. Using the suffixes o,k and e,k (for odd and even samples in the symbol space k) in place of 2k−1 and 2k respectively, equations (2) and (3) become:

$$y_{o,k} = A_k e^{jx_k} \left[ \begin{array}{c} s_{k-2}g\left(\frac{5T}{2}+\tau\right)+s_{k-1}g\left(\frac{3T}{2}+\tau\right)+s_k g\left(\frac{T}{2}+\tau\right)+ \\ s_{k+1}g\left(\frac{T}{2}-\tau\right)+s_{k+2}g\left(\frac{3T}{2}-\tau\right) \end{array} \right] + \eta_{o,k} \quad (4)$$

$$y_{e,k} = A_k e^{jx_k} \left[ \begin{array}{c} s_{k-2}g(2T+\tau)+s_{k-1}g(T+\tau)+s_k g(\tau)+ \\ s_{k+1}g(T-\tau)+s_{k+2}g(2T-\tau) \end{array} \right] + \eta_{e,k} \quad (5)$$

with $\eta_{o,k}$ and $\eta_{e,k}$ being complex Gaussian random variables with zero mean and correlation characteristics given by:

$$E\{\eta_{o,k}\eta'_{o,n}\} = E\{\eta_{e,k}\eta'_{e,n}\} = 2\sigma_\eta^2 g((k-n)T) \quad (6)$$

$$E\{\eta_{e,k}\eta'_{o,n}\} = 2\sigma_\eta^2 g\left((k-n)T - \frac{T}{2}\right) \quad (7)$$

where n is an integer and the prime symbol' indicates the conjugate transpose.

The objective of the carrier recovery method is to estimate the phase $x_k$ from the received signal samples $y_{o,k}$ and $Y_{e,k}$ during the sync word, i.e. for values of k from 1 to N=14 (the number of symbols in the sync word). This is done in two stages as described below, the first stage comprising an estimation of the complex fading factor and the second stage comprising an averaging process.

Estimation of Complex Fading Factor

As described above, the complex fading factor has the form $A_k e^{jx_k}$. With square brackets [] denoting a matrix and $[]^T$ representing the conjugate transpose of the matrix, and putting:

$$D_k = A_k e^{jx_k};$$

$$S_k = [s_{k-2} \ s_{k-1} \ s_k \ s_{k+1} \ s_{k+2}];$$

$$G_e = [g(2T+\tau) \ g(T+\tau) \ g(\tau) \ g(T-\tau) \ g(2T-\tau)]^T;$$

$$G_o = \left[g\left(\frac{5T}{2}+\tau\right) \ g\left(\frac{3T}{2}+\tau\right) \ g\left(\frac{T}{2}+\tau\right) \ g\left(\frac{T}{2}-\tau\right) \ g\left(\frac{3T}{2}-\tau\right)\right]^T;$$

$$T_k = \begin{bmatrix} S_k & G_e \\ S_k & G_o \end{bmatrix};$$

$$Y_k = \begin{bmatrix} y_{e,k} \\ y_{o,k} \end{bmatrix}; \quad \text{and}$$

$$\lambda_k = \begin{bmatrix} \eta_{e,k} \\ \eta_{o,k} \end{bmatrix};$$

then $$Y_k = D_k T_k + \lambda_k, \ k=1\ldots N \quad (8)$$

where $D_k$ is the complex fading factor, which embodies information of the amplitude factor $A_k$ and of the carrier phase $X_k$, and $\lambda_k$ is a noise vector having the following correlation matrix:

$$V_\lambda = E\{\lambda_k \ \lambda'_k\} = 2\sigma_\eta^2 \begin{bmatrix} 1 & g\left(\frac{T}{2}\right) \\ g\left(\frac{T}{2}\right) & 1 \end{bmatrix}$$

where again the prime symbol' indicates the conjugate transpose.

Assuming that $T_k$ is known, i.e. that τ and $s_k$ are known, then a one-step optimal estimate $\hat{D}_k$ (estimated values are denoted below by a circumflex symbol +) of the complex fading factor $D_k$ based on the least square criterion can be obtained as:

$$\hat{D}_k = (T_k \ V_\lambda^{-1} \ T_k)^{-1} T'_k V_\lambda^{-1} Y_k \quad (9)$$

The sampling delay τ is determined or estimated in the process of timing recovery. $S_k$, and hence the vector $T_k$, is fully known only for values of k from 3 to N−2=12, because the sync word symbols are known but symbols adjacent the sync word are unknown. For the estimation in equation (9), the two unknown symbols preceding and the two unknown symbols following the sync word are given zero values, so that:

$$S_1 = [0 \ 0 \ s_1 \ s_2 \ s_3];$$

$$S_2 = [0 \ s_1 \ s_2 \ s_3 \ s_4];$$

$$S_{13} = [s_{11} \ s_{12} \ s_{13} \ s_{14} \ 0]; \quad \text{and}$$

$$S_{14} = [s_{12} \ s_{13} \ s_{14} \ 0 \ 0]$$

Averaging Process

For carrier recovery, an estimate $\hat{x}_k$ of the carrier phase $x_k$ is derived from the estimate $\hat{D}_k$ of the complex fading factor using an averaging process. In different embodiments of the invention as described below the averaging process can provide a recursive average or a moving average, or it can be a dynamic averaging process constituted by Kalman filtering.

Recursive and Moving Averages

Denoting a complex variable for the symbol k as $F_k$, this variable being derived from the estimate $\hat{D}_k$, then the carrier phase estimate $\hat{x}_k$ is given by $\hat{x}_k = \arg(F_k)$.

For providing a recursive average, $F_k$ is defined by:

$$F_k = \hat{D}_k \text{ for } k=1$$

$$F_k = \hat{D}_k + h \ F_{k-1} \text{ for } k=2 \ldots N \quad (10)$$

where $0 \leq h \leq 1$ and h is an averaging memory factor. A desirable value of h can be determined by simulation, with a compromise between averaging over larger numbers of symbols (h tends towards 1) and reducing cumulative effects of estimation noise effects of phase fluctuations among different symbols (h tends towards 0). With the relatively small number N=14 of symbols in the sync word in an IS-54 system, the former factor appears to be dominant and a value of h=1 appears to be optimal, but smaller values (e.g. h=0.75 or h=0.5) can alternatively be used and especially may be preferred in systems with longer sync words or high SNR.

For a moving average, the averaging is performed on the symbol k as well as on an integer number L of symbols on each side of (i.e. before and after) the symbol k, and hence on a moving window of 2L+1 symbols centered on the symbol k, with the individual symbols in the window being given desired weighting factors. Thus in this case $F_k$ is defined by:

$$F_k = \sum_{i=k-L}^{k+L} w_i \hat{D}_i \quad (11)$$

where $w_i$ is the weighting factor for the estimate $\hat{D}_i$, with $w_i=0$ and $\hat{D}_i=0$ for i<1 and for i>N. Various window sizes and weighting schemes can be used. For example, the window size can be determined by L=5, with a weighting scheme in which the weights are equal throughout the window, decrease linearly with distance from the center of the window, or have a second order decrease with distance from the center of the window. These weighting schemes are denoted by weights $W0_i$, $W1_i$, and $W2_i$ respectively with the non-zero weighting factors given respectively by:

$$w_i = W0_i = 1$$

$$w_i = W1_i = (1-(|i-k|/2L))$$

$$w_i = W2_i = (1-(|i-k|/2L))^2$$

In each of these cases the symbol k at the center of the window has a weight of 1. An optimum weighting scheme (other schemes than these can instead be used) can be determined by simulation. For the sync word in an IS-54 system, with L=5 the best results appear to be produced with the scheme having equal weights $W0_i=1$.

Kalman Filtering

A one-step estimate $\hat{D}_k$ is given by the equation:

$$\hat{D}_k = A_k e^{jx_k} + \mu_k \quad (12)$$

where $\mu_k$ is a Gaussian process with zero mean and variance $2\sigma_{\mu_k}^2 = 2\sigma_{D_k}^2$.

Rewriting $\hat{D}_k$ as a new observation variable $y_k$, and assuming that the amplitude factor $A_k$ and frequency shift $\Delta x_k$ are constant during the observation, then a new observation model is defined by the equations:

$$y_k = A_k e^{jx_k} + \mu_k \quad k = 1, 2, 3, \ldots \quad (13)$$

$$A_k = A_{k-1}$$

$$x_k = x_{k-1} + \Delta x_{k-1} + \xi_k$$

$$\Delta x_k = \Delta x_{k-1}$$

where $\xi_k$ is a Gaussian process with zero mean and variance $2\sigma_\xi^2$ modeling phase jitter of the received signal.

Using the following substitutions:

$$z_k = e^{j\Delta x_k} \quad (14)$$

$$\Phi_k = \begin{bmatrix} D_k \\ z_k \end{bmatrix}$$

$$H = [1 \ 0]$$

the new observation model of equations (13) becomes:

$$D_k = D_{k-1} z_{k-1} e^{j\xi_k}$$

$$z_k = z_{k-1}$$

$$y_k = D_k + \mu_k \quad (15)$$

and can be rewritten in the following concise form:

$$\Phi_k = f(\Phi_{k-1}, \xi_k) \quad (16)$$

$$y_k = H\Phi_k + \mu_k \quad \text{where}$$

$$f(\Phi_{k-1}, \xi_k) = \begin{bmatrix} D_{k-1} z_{k-1} \xi_k \\ z_{k-1} \end{bmatrix}.$$

Expanding the function $f(\Phi_k, \xi_k)$ in first order Taylor series form (on variables $\Phi_{k-1}$ and $\xi_{k-1}$ at the point $(\hat{\Phi}_k, 0)$) gives:

$$f(\Phi_{k-1}, \xi_k) = f(\hat{\Phi}_{k-1}, 0) + \frac{\partial}{\partial \Phi_{k-1}} f(\hat{\Phi}_{k-1}, 0)(\Phi_{k-1} - \hat{\Phi}_{k-1}) + \frac{\partial}{\partial \xi_k} f(\hat{\Phi}_{k-1}, 0)\xi_k$$

and the Jacobi matrix can be expressed in the form:

$$\frac{\partial}{\partial \Phi_{k-1}} f(\hat{\Phi}_{k-1}, 0) = \begin{bmatrix} \hat{z}_{k-1} & \hat{D}_{k-1} \\ 0 & 1 \end{bmatrix} \quad (17)$$

$$\frac{\partial}{\partial \xi_k} f(\hat{\Phi}_{k-1}, 0) = \begin{bmatrix} j\hat{D}_{k-1}\hat{z}_{k-1} \\ 0 \end{bmatrix}$$

$$f(\hat{\Phi}_{k-1}, 0) = \begin{bmatrix} \hat{D}_{k-1}\hat{z}_{k-1} \\ \hat{z}_{k-1} \end{bmatrix}$$

Consequently, a linearized indirect model can be expressed as:

$$\Phi_k = W_k \Phi_{k-1} + C_k + \Lambda_k$$

$$y_k = H\Phi_k + \mu_k \quad (18)$$

where:

$$C_k = f(\hat{\Phi}_{k-1}, 0) - \frac{\partial}{\partial \Phi_{k-1}} f(\hat{\Phi}_{k-1}, 0)\hat{\Phi}_{k-1} = \begin{bmatrix} -\hat{z}_{k-1}\hat{D}_{k-1} \\ 0 \end{bmatrix}$$

$$W_k = \begin{bmatrix} \hat{z}_{k-1} & \hat{D}_{k-1} \\ 0 & 1 \end{bmatrix}$$

$$\Lambda_k = \begin{bmatrix} j\xi_k \hat{D}_{k-1}\hat{z}_{k-1} \\ 0 \end{bmatrix}$$

$$E\{\Lambda_k\} = \begin{bmatrix} 0 \\ 0 \end{bmatrix}$$

$$E\{\Lambda_k \Lambda_k'\} = \begin{bmatrix} \sigma_\xi^2 |\hat{D}_{k-1}|^2 & 0 \\ 0 & 0 \end{bmatrix}$$

Applying Kalman filtering theory to the model of equation (18) gives a recursive estimation algorithm for the indirect variable $\Phi_k$:

$$P_k = W_k R_k W_k' + B_k \qquad (19)$$

$$K_k = P_k H' (H P_k H' + 2\sigma_{\mu_k}^2 I)^{-1}$$

$$\hat{\Phi}_k = \hat{\Phi}_{k,extr} + K_k (y_k - H\hat{\Phi}_{k,extr})$$

$$\hat{\Phi}_{k,extr} = f(\hat{\Phi}_{k-1}, 0) = \begin{bmatrix} \hat{D}_{k-1} \hat{z}_{k-1} \\ \hat{z}_{k-1} \end{bmatrix}$$

$$R_k = P_k - K_k H P_k$$

$$k \geq 2$$

where I is the unit matrix and with the initial conditions:

$$\hat{\Phi}_1 = \begin{bmatrix} y_1 \\ 0 \end{bmatrix}$$

$$R_1 = 2\sigma_{\mu_k}^2 I.$$

From equations (14), it can be seen that the estimated indirect variable $\hat{\Phi}_k$ provides an estimated amplitude factor $\hat{A}_k$, an estimated carrier phase $\hat{x}_k$, and an estimated frequency shift $\Delta \hat{x}_k$ from the equations:

$$\hat{A}_k = |\hat{\Phi}_k(1)| \qquad (20)$$

$$\hat{x}_k = \arg(\hat{\Phi}_k(1)) \qquad (21)$$

$$\Delta \hat{x}_k = \arg(\hat{\Phi}_k(2)) \qquad (22)$$

The implementation of the Kalman filtering process, which constitutes a dynamic averaging process, as described above requires a total of about 40 complex additions/multiplications and one real division per sample, and can conveniently be carrier out in a digital signal processing (DSP) integrated circuit. The Kalman filtering process has the advantage of providing estimates of the amplitude factor and frequency shift, as well as of the carrier phase as is required for carrier recovery, but requires considerably more computation than the recursive average and moving average processes, which likewise may be carried out in a DSP integrated circuit.

Physical Implementation

Referring now to the drawings, FIG. 1 illustrates in a block diagram parts of a wireless digital communications receiver, in which a wireless digital communications signal is supplied via an RF (radio frequency) circuit 20 of a receiver to a down converter 22 to produce a signal which is sampled at twice the symbol rate, i.e. with a sampling period of T/2, by a sampler 24, the samples being converted into digital form by an A-D (analog-to-digital) converter 26. The digitized samples are interpolated by an interpolator 28 in accordance with a recovered estimated sampling delay $\hat{\tau}_k$ to produce samples $Y_k$, at estimated optimal sampling times, for further processing. The estimated sampling delay $\hat{\tau}_k$ represents the sampling delay $\tau$ for the symbol k. As an alternative to the provision of the interpolator 28, the estimated sampling delay $\hat{\tau}_k$ could be used directly to control the sampling time of the sampler 24. The interpolator 28 forms part of digital circuits 30, conveniently implemented in a DSP integrated circuit, which also include a timing recovery and frame synchronization block 32, a carrier recovery block 34, and a residual phase corrector 36. The samples $Y_k$ from the interpolator 28 are supplied as the input signal to the blocks 32, 34, and 36. The timing recovery and frame synchronization block 32 is not described further here but can produce the estimated sampling delay $\hat{\tau}_k$ in any convenient manner.

Imperfections in the down converter 22, signal reflections, and Doppler effects due to movement of the receiver result in the signal supplied to the carrier recovery block 34 having a residual or error carrier phase component, which is removed by the residual carrier phase corrector 36 in accordance with the estimated carrier phase $\hat{x}_k$ produced by the carrier recovery block 34 in accordance with one of the averaging processes described above. To this end the carrier recovery block 34 is also supplied with the estimated sampling delay $\hat{\tau}_k$ from the block 32. As indicated in the introduction, the effectiveness of the carrier recovery has a direct impact on the performance of the communications system. Precise carrier recovery is particularly required for communications systems using coherent detection, which provide the advantage of a 3 dB performance improvement over incoherent detection, but the invention facilitates carrier recovery in either case.

Figure 2:
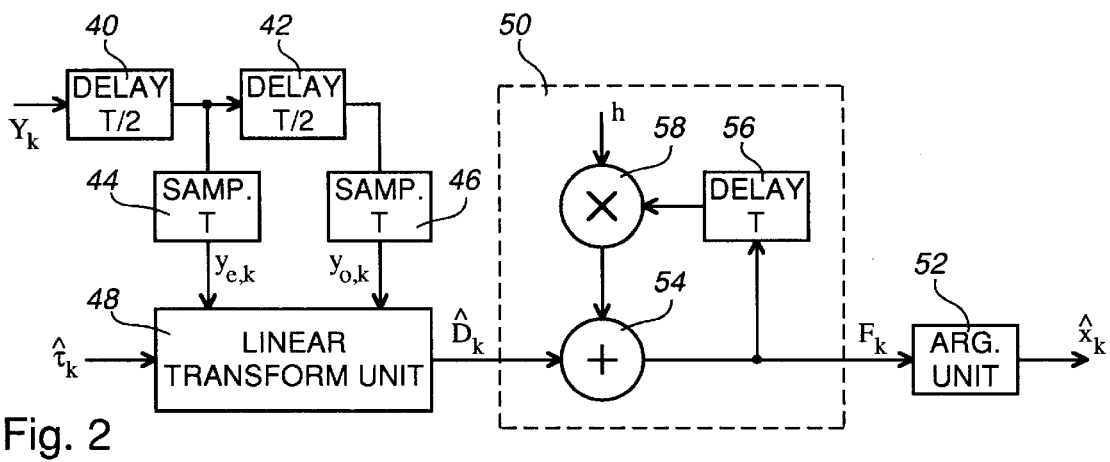
FIGS. 2, 3, and 4 schematically illustrate carrier recovery arrangements in accordance with embodiments of this invention.

FIG. 2 illustrates a DSP arrangement of parts of the carrier recovery block 34 for implementing carrier recovery in accordance with the recursive averaging process described above. The arrangement comprises delay units 40 and 42 each providing a delay of T/2, samplers 44 and 46 each having a sampling period of T, a linear transform unit 48, a recursive averaging unit 50 shown within a broken-line box, and a unit 52 providing an arg ( ) function. The averaging unit 50 comprises a summing function 54, a delay unit 56 providing a delay of one symbol period T, and a multiplication function 58.

Each symbol sample $Y_k$ is delayed successively in the delay units 40 and 42, the outputs of which are resampled by the samplers 44 and 46 respectively to produce at their outputs the received sync word symbol samples $y_{o,k}$ and $y_{e,k}$ discussed above with reference to equations (4) and (5). The linear transform unit 48 is supplied with these samples $y_{o,k}$ and $Y_{e,k}$ and with the estimated sampling delay $\hat{\tau}_k$, and is arranged to perform a one-step least square estimation to produce the estimate $\hat{D}_k$ of the complex fading factor in accordance with equation (9) above. The recursive averaging unit 50 is arranged to produce the complex variable $F_k$ in accordance with equation (10) above, and the unit 52 is arranged to determine the argument of this complex variable $F_k$ and hence to provide the desired estimate $\hat{x}_k$ of the carrier phase as described above. The unit 52 can for example comprise a calculating unit or a look-up table in memory.

In the recursive averaging unit 50, inputs of the summing function 54 are supplied with the current estimate $\hat{D}_k$ of the complex fading factor and the previous output, $F_{k-1}$, of the function 54, delayed by T in the delay unit 56, multiplied in the multiplication function 58 by the factor h, to produce the current output $F_k$ in accordance with equation (10). It can be appreciated that, in the case of h=1, the multiplication function 58 can be omitted.

Figure 3:
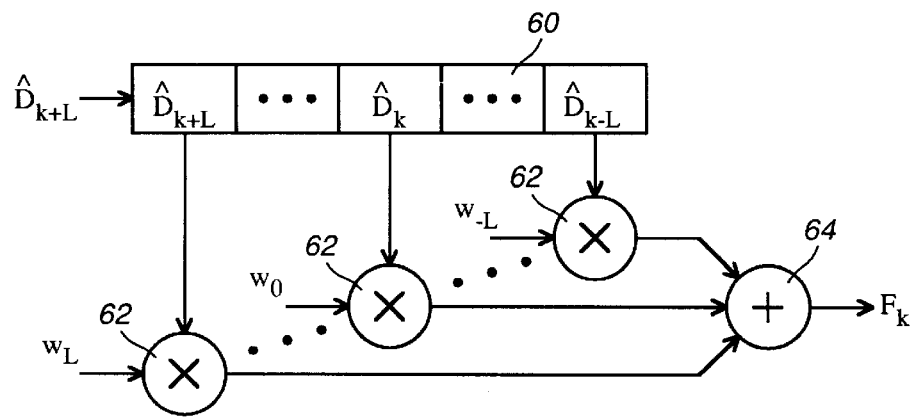

The recursive averaging unit 50 in the arrangement of FIG. 2 can be replaced by a moving average unit, for example as illustrated in FIG. 3, to implement carrier recovery using the moving average process in accordance with equation (11) above. The moving average unit of FIG. 3 includes a shift register 60, operating as a serial-to-parallel converter with delay stages each providing a delay of T, providing 2L+1 parallel output estimates $\hat{D}_{k+L}$ to $\hat{D}_{k-L}$ of the complex fading factor, supplied by the linear transform unit 48 in FIG. 2, within the moving average window. The moving average unit of FIG. 3 further includes 2L+1 multiplication functions 62, each of which is arranged to multiply a respective one of these parallel output estimates by the corresponding weighting factor in accordance with the selected weighting scheme as described above, and a summing function 64 arranged to sum the resulting 2L+1 products to produce the complex variable $F_k$, which is supplied to the unit 52 of FIG. 2. It can be appreciated that, using the equal weighting scheme W0 as described above in which all of the weighting factors are 1, the multiplication functions 62 can be omitted.

It can be appreciated that, apart from the moving average unit of FIG. 3, any other desired averaging (or low-pass filtering or integrating) unit can be used in place of the recursive averaging unit 50. In particular, the averaging unit 50 and the unit 52 can be replaced by a Kalman filtering unit 70 as described below with reference to FIG. 4. Kalman filtering is a dynamic averaging process (i.e. the gains of the Kalman filter are changed dynamically in a recursive manner), and it can be appreciated that any other dynamic averaging process could instead be used. Furthermore, it can be appreciated that the Kalman filter could be arranged to have constant gain factors, thereby avoiding the computation of the Kalman filter gains for each symbol as in the unit 70 described below.

Figure 4:
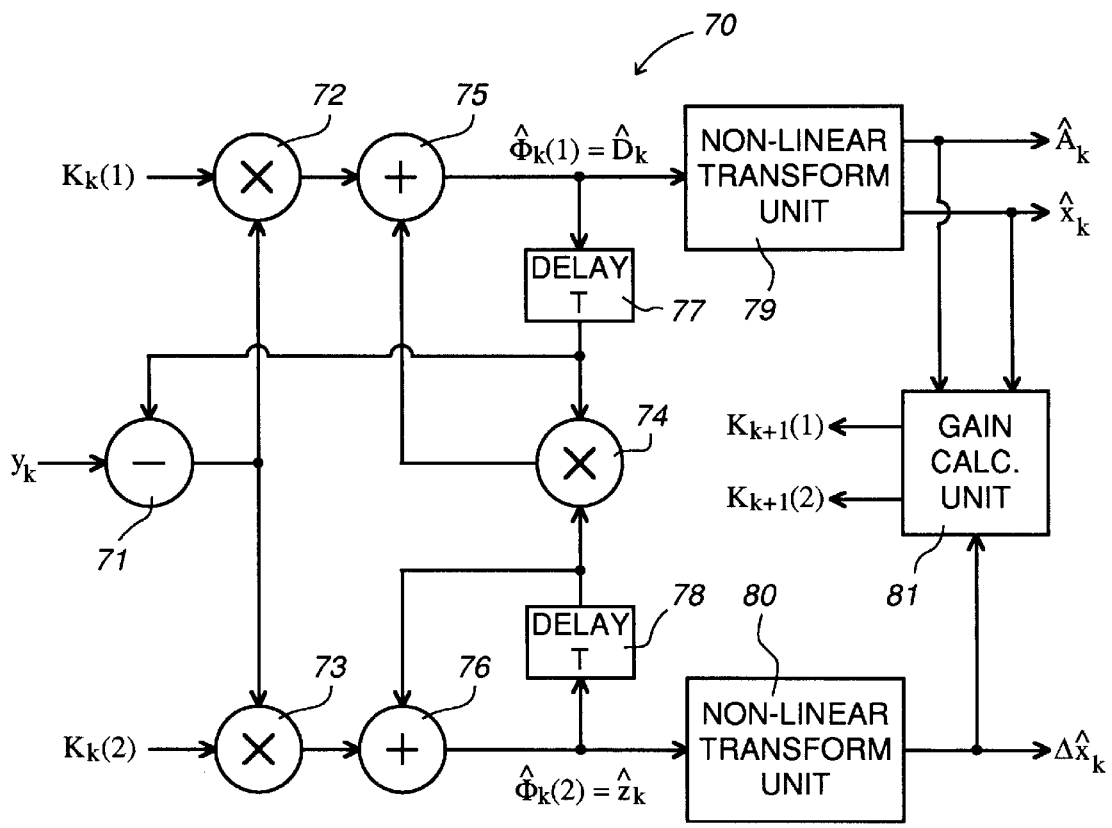

FIG. 4 shows the Kalman filtering unit 70 which can be used in place of the units 50 and 52 of FIG. 2. Consistent with the notation above for the Kalman filtering process, the output $\hat{D}_k$ of the linear transform unit 48 in FIG. 2 is applied as an input $y_k$ to the unit 70. The unit 70 comprises a subtractor 71, multipliers 72 to 74, adders 75 and 76, delay units 77 and 78 each providing a delay of one symbol period T, non-linear transform units 79 and 80, and a Kalman filter gain calculation unit 81.

The input $y_k$ is supplied to an additive input, and an output of the delay unit 77 is supplied to a subtractive input, of the subtractor 71, the output of which is supplied to the multipliers 72 and 73 to be multiplied by respective Kalman filter gains $K_k(1)$ and $K_k(2)$ supplied for the current symbol k from the gain calculation unit 81. The output of the multiplier 72 is supplied to one input of the adder 75, another input of which is supplied with the output of the multiplier 74. The output of the adder 75 constitutes an estimated component $\hat{\Phi}_k(1) = \hat{\Phi}_k$ (in accordance with equation (14) above) of the estimated indirect variable $\hat{\Phi}_k$ and is supplied to an input of the non-linear transform unit 79 and to the delay unit 77, the output of which is also supplied to one input of the multiplier 74. The output of the multiplier 73 is supplied to one input of the adder 76, the output of which constitutes an estimated component $\hat{\Phi}_k(2) = \hat{z}_k$ (in accordance with equation (14) above) of the estimated indirect variable $\hat{\Phi}_k$. This output is supplied to an input of the non-linear transform unit 80 and to the delay unit 78, the output of which is supplied to another input of the multiplier 74 and to another input of the adder 76.

The unit 70 thus performs extended Kalman filtering on the estimated complex fading factor to produce the estimated indirect variable $\hat{\Phi}_k$, comprising the two estimated components $\hat{\Phi}_k(1)$ and $\hat{\Phi}_k(2)$, in accordance with the third line of equations (19) above. The non-linear transform unit 79 produces from the estimate $\hat{\Phi}_k(1)$ the estimated amplitude factor $\hat{A}_k$ in accordance with equation (20) above and the estimated carrier phase $\hat{x}_k$ in accordance with equation (21) above, and the non-linear transform unit 80 produces the estimated frequency shift $\Delta \hat{x}_k$ in accordance with equation (22) above. These estimates are supplied to the gain calculation unit 81 to compute the Kalman filter gains $K_{k+1}(1)$ and $K_{k+1}(2)$ for use recursively for the next symbol k+1 in accordance with the second line of equations (19) above. Like the unit 52 in FIG. 2, the non-linear transform units 79 and 80 can comprise calculating units or look-up tables in memory.

Although only the estimated carrier phase $\hat{x}_k$ is required for carrier recovery, as can be seen from the above description the Kalman filtering process also produces the estimated amplitude factor $\hat{A}_k$ and the estimated frequency shift $\Delta \hat{x}_k$ which may also be used for other purposes. Regardless of which averaging process is used, the carrier recovery process can be implemented alone or in combination with timing recovery and/or frame synchronization processes.

Figure 5:
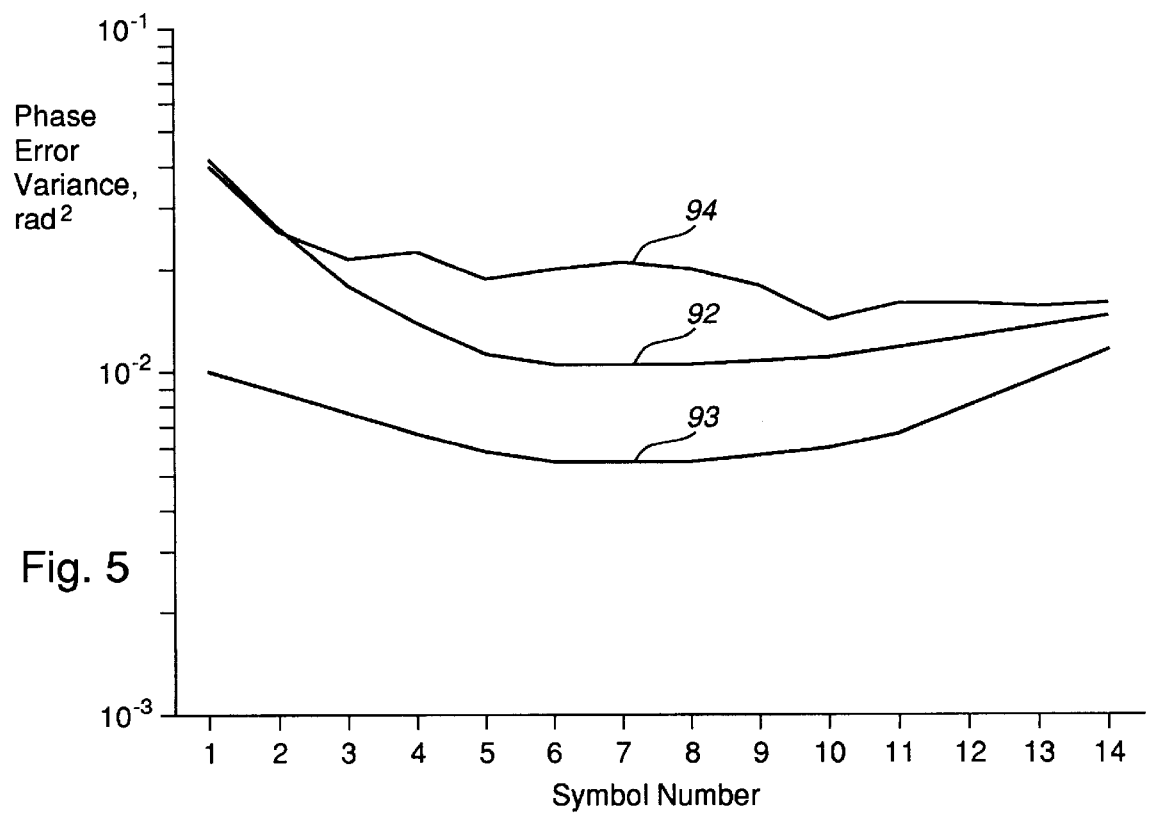
FIGS. 5 and 6 are graphs illustrating relative performances of the carrier recovery arrangements.
Figure 6:
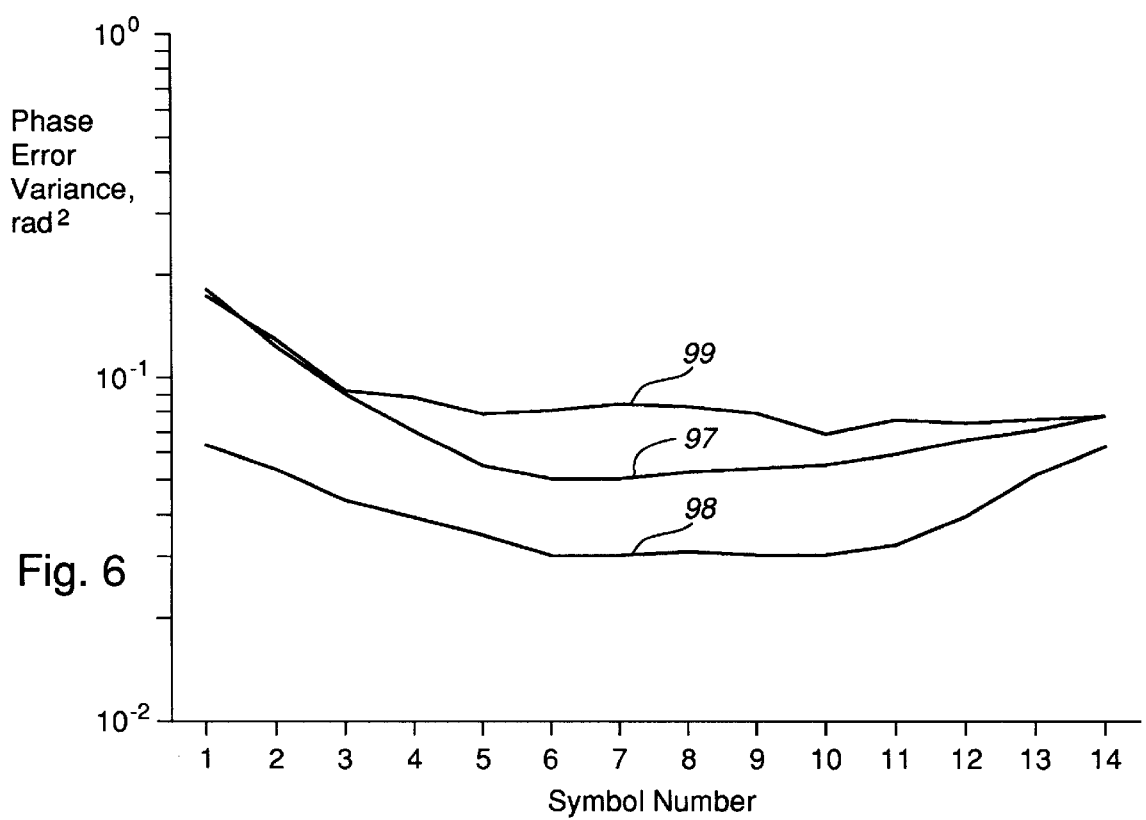

FIGS. 5 and 6 are graphs illustrating simulations of relative performances of the carrier recovery arrangements, for a non-fading channel and a Rayleigh-fading channel respectively, in each case for a SNR of 10 dB. The Rayleigh-fading channel represents an IS-54 system having a carrier frequency of 900 MHz for a mobile travelling at a speed of 120 km. per hour. In each figure the phase error variance in $rad^2$ is shown as a function of the symbol number in the sync word.

A line 94 in FIG. 5 and a line 99 in FIG. 6 are for a carrier recovery arrangement using Kalman filtering as described above with reference to FIG. 4. A line 92 in FIG. 5 and a line 97 in FIG. 6 are for a carrier recovery arrangement using recursive averaging as described above with reference to FIG. 2, with h=1. As can be appreciated, this provides comparable or slightly better performance, relative to the Kalman filtering arrangement, with a computation complexity which is greatly reduced because the recursive averaging unit 50 is very easy to implement. A line 93 in FIG. 5 and a line 98 in FIG. 6 are for a carrier recovery arrangement using a moving average as described above with reference to FIG. 3, with L=5 and equal weights W0. As can be appreciated, this provides even better relative performance, with a complexity which is greater than that of the recursive averaging arrangement but less than that of the Kalman filtering arrangement.

Simulation results have shown that carrier recovery arrangements in accordance with the invention enable carrier recovery to be achieved with low mean phase and frequency error for relatively low SNR, and that this is accomplished well within the 14 symbols of the sync word sequence of an IS-54 system. These results provide an improvement of more than 10 dB over phase locked loop techniques traditionally used for carrier recovery.

Although particular embodiments of the invention have been described in detail, it should be appreciated that numerous modifications, variations, and adaptations may be made without departing from the scope of the invention as defined in the claims.

What is claimed is:

1. A method of carrier recovery using a known sync (synchronization) word in a received communications signal, comprising the steps of:
    estimating from symbols of the sync word a complex fading factor, embodying information of carrier phase, using a least square criterion; and
    estimating carrier phase from the complex fading factor using an averaging process.

2. A method as claimed in claim 1 wherein the step of estimating the complex fading factor comprises performing a one-step optimal estimate using known symbols of the sync word and zero values for unknown symbols adjacent to the sync word.

3. A method as claimed in claim 1 wherein the step of estimating carrier phase comprises providing a recursive average of the complex fading factor.

4. A method as claimed in claim 1 wherein the step of estimating carrier phase comprises providing a moving average of the complex fading factor.

5. A method as claimed in claim 1 wherein the step of estimating carrier phase comprises Kalman filtering the complex fading factor.

6. A method as claimed in claim 5 and further comprising the step of estimating an amplitude factor and a frequency shift of the complex fading factor.

7. A method as claimed in claim 6 and further comprising the step of recursively determining Kalman filter gain from the estimated carrier phase, amplitude factor, and frequency shift.

8. A method as claimed in claim 1 wherein the step of estimating carrier phase comprises forming an argument of an average of the complex fading factor.

9. Apparatus for use in carrier recovery from a received communication signal including a known sync (synchronization) word, the apparatus comprising:

a linear transform unit responsive to samples of the received signal and to a sampling delay signal for estimating from sampled symbols of the sync word a complex fading factor, embodying information of carrier phase, using a least square criterion;

an averaging unit for producing an average of the complex fading factor; and a unit for producing an argument of the average to constitute an estimated carrier phase for carrier recovery.

10. Apparatus as claimed in claim 9 wherein the averaging unit comprises a recursive averaging unit.

11. Apparatus as claimed in claim 9 wherein the averaging unit comprises a moving average unit.

12. Apparatus as claimed in claim 9 wherein the averaging unit comprises a Kalman filter.

13. Apparatus as claimed in claim 12 and further comprising functions responsive to the averaged complex fading factor for producing estimates of an amplitude factor and a frequency shift of the complex fading factor.

14. Apparatus as claimed in claim 13 and further comprising a gain calculation unit responsive to the estimated carrier phase, amplitude factor, and frequency shift for recursively determining gain of the Kalman filter.

15. Apparatus as claimed in claim 9 wherein the linear transform unit, averaging unit, and unit for producing an argument are constituted by functions of at least one digital signal processor.

* * * * *